J. C. BARBER.
ROLLER BEARING.
APPLICATION FILED APR. 15, 1911.
1,016,469.
Patented Feb. 6, 1912.
3 SHEETS—SHEET 1.
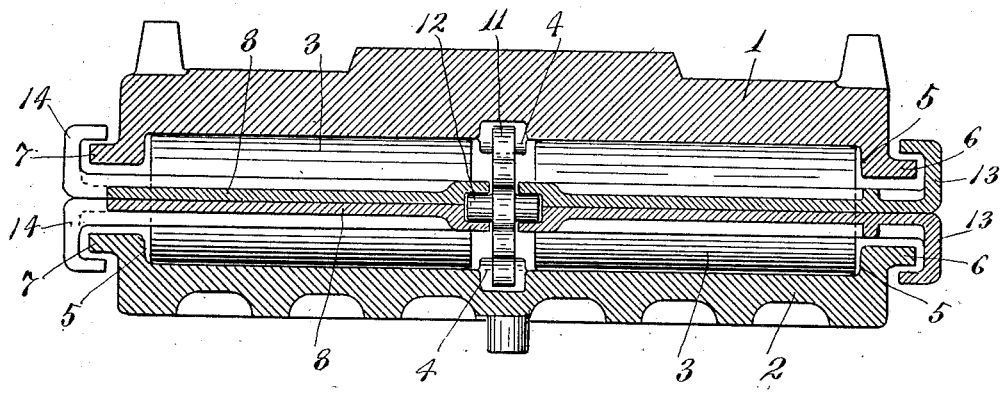
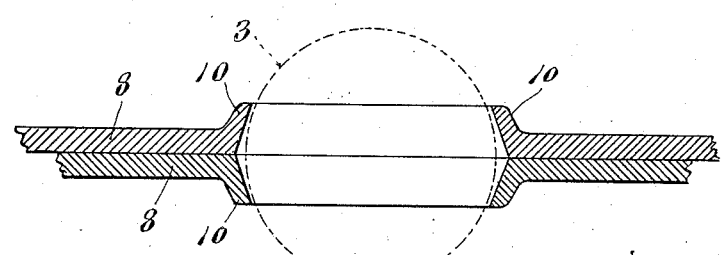
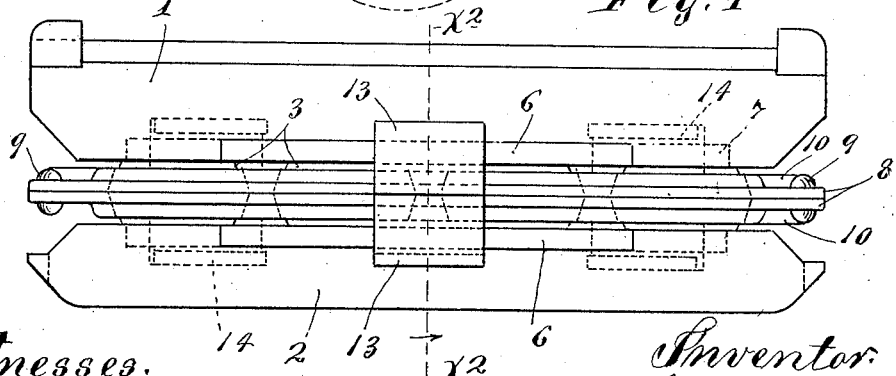
Witnesses.
A. H. Opsahl.
H. L. Opsahl.
Inventor.
John C. Barber
By his Attorneys
Williamson Merchant

J. C. BARBER.
ROLLER BEARING.
APPLICATION FILED APR. 15, 1911.

1,016,469.

Patented Feb. 6, 1912.
3 SHEETS—SHEET 2.

Witnesses.
A. H. Opsahl.
H. L. Opsahl.

Inventor
John C. Barber
By his Attorneys
Williamson Merchant

J. C. BARBER.
ROLLER BEARING.
APPLICATION FILED APR. 15, 1911.
1,016,469.
Patented Feb. 6, 1912.
3 SHEETS—SHEET 3.
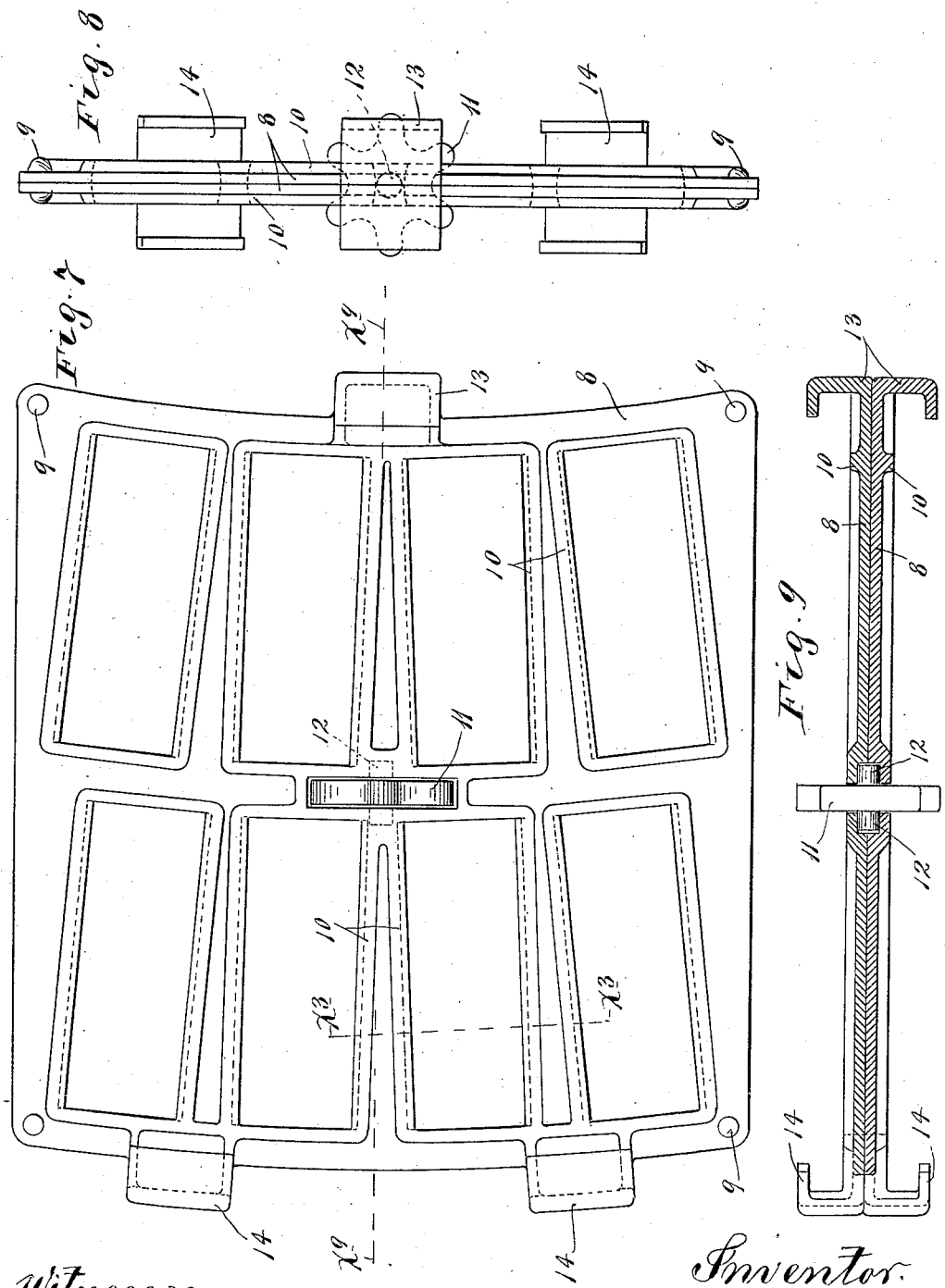
Witnesses.
A. H. Opsahl.
H. L. Opsahl.
Inventor.
John C. Barber
By his Attorneys
Williamson Merchant

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

ROLLER-BEARING.

1,016,469. Specification of Letters Patent. Patented Feb. 6, 1912.

Application filed April 15, 1911. Serial No. 621,240.

*To all whom it may concern:*

Be it known that I, JOHN C. BARBER, a citizen of the United States, residing at Chicago, in the county of Cook and State of Illinois, have invented certain new and useful Improvements in Roller-Bearings; and I do hereby declare the following to be a full, clear, and exact description of the invention, such as will enable others skilled in the art to which it appertains to make and use the same.

My invention has for its object to provide an improved roller bearing especially adapted for use as a side bearing for railway cars, and to this end the invention consists of the novel devices and combinations of devices hereinafter described and defined in the claims.

The present roller bearing is especially designed as an improvement on the roller bearing disclosed and claimed in my prior Patent No. 987,422, of date, March 21, 1911. The chief feature of the improvement involved in the present invention over that of the said prior patent is the provision of means whereby the upper and lower roller bearing plates are interlocked to the roller spacing cage and are held in operative relation to each other and to the rollers, so that the entire roller bearing device may be handled or shipped as an entirety without danger of separation or disorder of the component parts of the said bearing.

In the accompanying drawings which illustrate the invention, like characters indicate like parts throughout the several views.

Figure 4:
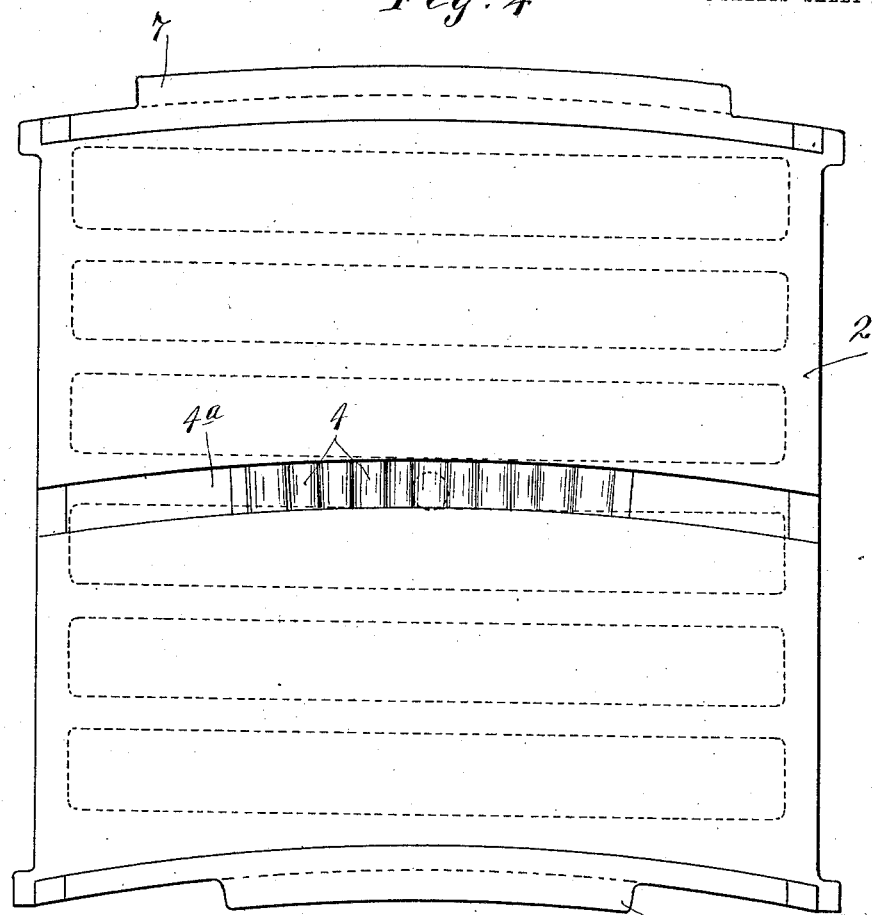
Figure 5:
Figure 6:
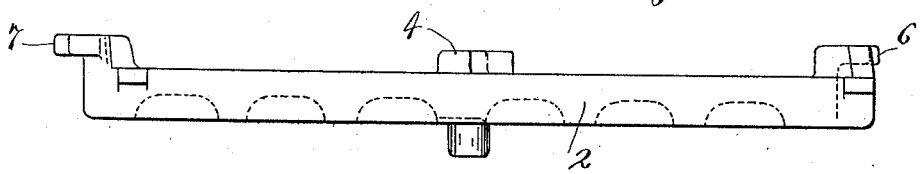

Referring to the drawings, Figure 1 is a side elevation of the improved roller bearing; Fig. 2 is a transverse section taken on the line $x^2$ $x^2$ of Fig. 1; Fig. 3 is an enlarged detail in section taken on the line $x^3$ $x^3$ of Fig. 7; Fig. 4 is a plan view of the lower roller bearing plate and may also be treated as a bottom plan view of the upper roller bearing plate; Fig. 5 is a side elevation of the lower roller bearing plate; Fig. 6 is an end elevation of the said lower roller bearing plate; Fig. 7 is a plan view of the so-called roller spacing cage; Fig. 8 is an elevation of the said cage; and Fig. 9 is a vertical section taken approximately on the line $x^9$ $x^9$ of Fig. 7.

The numerals 1 and 2 indicate, respectively, the upper and lower bearing plates between which bearing rollers 3 are interposed. The roller bearing illustrated in the drawings is especially designed as side bearing for railway cars, and hence, the roller engaging surfaces of the upper and lower plates are flat, smooth, and parallel. Preferably, the rollers 3 are arranged in two rows and they are all arranged with their axes radiating from a common point assumed to be the axis of the pivotal connection between the car body and truck. Between the two rows of rollers 3, the upper and lower bearing plates are provided with rack teeth 4 that extend on the arc of a circle struck from the above noted point from which the axes of the rollers radiate. At their inner and outer edges, the upper and lower bearing plates 1 and 2 are provided with thrust shoulders 5 which confine the rollers between the bearing plates, or otherwise stated, prevent the rollers from moving endwise outward while leaving the same free for traveling movement in respect to the bearing plates. Also the said upper and lower bearing plates are provided at their inner edges with outwardly projecting retaining flanges 6, and at their outer edges they are provided with similar retaining flanges 7, all of which flanges, as shown, are segmental and extend parallel to the racks 4 and to the thrust shoulders 5. The rollers 3 are held properly spaced but free for rotation by a so-called spacing cage made up of two flat plates 8 placed face to face and rigidly connected, preferably at their four corners, by rivets 9. Both of these plates 8 have openings in which the rollers are seated, and at the longitudinal edges of these openings, the said plates are provided with upwardly and downwardly extended roller retaining flanges 10 that embrace enough of the circumference of the rollers to hold the rollers against displacement in respect to the said cage.

To maintain the rollers always in proper relative positions in respect to the bearing plates, a toothed wheel or pinion 11 is journaled to the roller spacing cage and has engagement with the upper and lower segmental racks 4 of the upper and lower bearing plates. Preferably, the pinion 11 is located at the center of the cage between the two rows or series of rollers and is provided with projecting trunnions 12 that are loosely journaled in seats formed, in part, in each of the two plates of a roller cage, the said plates being cut away at their central portions to afford clearance for the said pinion.

As is evident, when the two bearing plates 1 and 2 are oscillated in respect to each other, the pinion 11 will prevent slipping of the rollers in respect to the said bearing plates and will thus prevent the rollers from working in one direction or in the other beyond the proper predetermined working position in respect to the said bearing plates. Otherwise stated, the cage and coöperating pinion and racks act as safety devices to insure proper traveling of the rollers.

To interlock the roller spacing cage to both bearing plates and thus securing the two bearing plates in respect to each other, with all of the said parts, however, free for required relative movements, the plates which form the said cage are provided at their inner edges with hook-like retaining lugs 13 and at their outer edges with similar hook-like retaining lugs 14. The upper and lower inner retaining lugs 13 engage, respectively, with the upper and lower retaining flanges 6 of the upper and lower bearing plates, while the upper and lower outer retaining lugs 14 engage, respectively, with the upper and lower retaining flanges 7 of said upper and lower bearing plates. By this means, as long as the two plates of the roller spacing cage are secured together, the upper and lower bearing plates are interlocked together but free for the desired relative movements. When it is desired to separate the members of the bearing plate, the two bearing plates will be moved to extreme positions in respect to each other so as to expose the rivets 9, first at one end and then at the other, thus permitting removal of the rivets. The extreme traveling movements of the bearing plates in respect to each other and in respect to the rollers may be limited in various different ways, but, as shown, this is accomplished by providing the racks 4 with raised toothless end extensions 4$^a$ onto which the pinion 11 cannot run.

The improved roller bearing above described, as is evident, is capable of being shipped and handled without possibility of loss or displacement of any of the parts thereof, and hence, is always ready for application to the car as a side bearing or to any other mechanism where a roller bearing of the general character disclosed is desired.

What I claim is:

1. The combination with upper and lower bearing plates and interposed rollers, of a roller spacing cage made up of separately formed but rigidly connected sections, one having interlocked engagement with the upper bearing plate, and the other, with the lower bearing plate, and the said interlocking engagements permitting traveling movements of said bearing plates in respect to each other and in respect to said cage and rollers, but holding the said parts against separation.

2. The combination with upper and lower roller bearing plates and interposed rollers, of a roller spacing cage made up of two plates normally connected flatwise together, one of the said cage plates having hook-like retaining lugs engageable with one of the said bearing plates, the other of said cage plates having hook-like retaining lugs engageable with the other bearing plate, the said parts being thus held against separation but with freedom for traveling movements in respect to each other.

3. The combination with upper and lower roller bearing plates provided at their inner and outer edges with projecting retaining flanges, of rollers interposed between said bearing plates, and a roller spacing cage made up of two flat plates normally connected by rivets, one of the said cage plates having inner and outer hook-like retaining lugs coöperating with the retaining flanges of one of the said bearing plates, and the other of said cage plates having inner and outer hook-like lugs coöperating with the retaining flanges of the other bearing plate.

In testimony whereof I affix my signature in presence of two witnesses.

JOHN C. BARBER.

Witnesses:
LEE W. BARBER,
A. M. LOVE.

Copies of this patent may be obtained for five cents each, by addressing the "Commissioner of Patents, Washington, D. C."